Patented Oct. 25, 1932

1,884,802

UNITED STATES PATENT OFFICE

GEORGE W. MILES, OF BOSTON, MASSACHUSETTS, AND CAMILLE DREYFUS, OF NEW YORK, N. Y., ASSIGNORS TO CELANESE CORPORATION OF AMERICA, A CORPORATION OF DELAWARE

INORGANIC CELLULOSE ESTERS AND MANUFACTURE THEREOF

No Drawing. Application filed April 14, 1926. Serial No. 102,085.

It is well known that inorganic esters of cellulose, like nitro cellulose, are obtained by treating cellulose or its conversion products with nitric acid in the presence of large quantities of sulphuric acid. The use of large amounts of sulphuric acid in these reactions has many draw-backs, among which is the production of nitro-cellulose of comparatively low stability.

We have now found that inorganic esters of cellulose can be produced without the use of sulphuric acid or with the use of only very small quantities of sulphuric acid. In these cases the reaction is not dangerous as it usually is in using sulphuric acid as a medium of reaction and products of remarkable qualities and stability are obtained by the new process. We have found that in using phosphoric acid ($H_3PO_4$ and/or $HPO_3$) instead of sulphuric acid as a medium of reaction that cellulose combines with the inorganic acid (but not with phosphoric acid) to form an ester of the acid or acids employed. For instance, cellulose nitrate can be produced by mixing nitric acid with cellulose in the presence of appropriate quantities of phosphoric acid ($H_3PO_4$) with or without the addition of metaphosphoric acid but the presence of metaphosphoric acid ($HPO_3$) or similar acting materials has a valuable influence on the facilitation of this reaction. There can be added to the reaction mixture, if thought advisable, contact materials, catalyzers or condensing agents; for instance, the presence of small quantities of sulphuric acid or other similar acting materials are sometimes helpful in speeding up the reaction. The reaction as carried out by the applicants can be executed at a wide range of temperature and time, whereas the nitration when carried on in the presence of large amounts of $H_2SO_4$ must be performed very rapidly and at low temperatures. However in order to obtain a high quality material the reaction is preferably executed at as low a temperature as convenient for obtaining the esters required. The best temperature to be chosen for the execution of the reaction is directly dependent upon the ingredients present during the reaction. For instance, in the presence of sulphuric acid, preferably a much lower temperature is used than in its absence and the same thing applies, but not to the same extent, to the presence of metaphosphoric acid ($HPO_3$) or similar acting ingredients. The cellulose used for the purpose of the present reaction may be cotton, cotton linters, cellulose derived from wood, or cellulose of any other convenient form. It also includes the cellulose conversion products, such as hydrates of cellulose, oxycelluloses and the like and other cellulose derivatives, as long as any part of the hydrogen of the hydroxyl groups of the cellulose has not been substituted.

This invention comprises all inorganic cellulose esters manufactured according to this process, whether made in one or more stages, when any part of the hydrogen of the hydroxyl groups contained in the cellulose or its conversion products, etc., has been replaced by an inorganic acid radical. In case a mono basic acid, like nitric acid, etc., is used in conjunction with cellulose and phosphoric acid with or without the addition of other ingredients as hereinbefore and hereinafter described then nitro esters, or other esters of cellulose are obtained. In case di-basic acids or poly-basic acids are used, for example sulphuric acid, it is obvious that either neutral or acid esters of cellulose can be formed. Thus in the case of sulphuric acid either an acid cellulose sulfonester or a neutral cellulose sulfate can be produced as desired.

This invention includes, therefore the esters of cellulose with all inorganic acids and includes also the esters of cellulose formed with di-basic inorganic acids and the inorganic or organic derivatives of the di-basic inorganic acids. For example, by treating cellulose in the presence of phosphoric acid ($H_3PO_4$ and/or $HPO_3$) with para-toluol-sulphonic acid or with ethyl sulphonic acid or with benzol sulphonic acid, etc. etc. the corresponding cellulose esters will be obtained; e. g., para-toluol-sulfon-esters of cellulose, ethyl sulfon-esters of cellulose, benzol sulfon-esters of cellulose. The same thing applies in using for the esterification of the cellulose in the presence of phosphoric acid other poly-basic inorganic acids where none or one or more of the salt-forming hydrogens are replaced by organic or inorganic groups provided that at least one salt-forming hydrogen in this acid is still free for the formation of the esters.

Cellulose or its conversion products can be subjected to a pretreatment before the reaction takes place in order to facilitate the reaction. For instance, it can be treated with a mixture of glacial acetic acid containing two (2) or three (3) or more percent of sulphuric acid in sufficient quantity and during a period long enough to bring the product to the desired reactivity. Also a pre-treatment with phosphoric acid ($H_3PO_4$) of 70% to 85% strength in the presence or in the absence of a small percentage of the sulphuric acid, or any other suitable methods of pre-treatment, can be used.

This invention embraces the cellulose esters whether they are formed in solution or in suspension. For certain purposes it is possible to conduct the reaction so that the cellulose esters are in solution in the reaction mixture. In this latter case the resulting solution can be used for certain purposes as such or it can be used after the addition of certain ingredients to neutralize the effect of certain constituents of the reaction mixture. For instance, if sulphuric acid was present it might be advantageous to neutralize the sulphuric acid for certain purposes with alkalis or with salts, like sodium acetate, etc. Solutions such as the above with or without neutralization can be used for the manufacture of films or artificial silks, etc. Or if desired, the ester can be precipitated by the introduction of water or similar acting fluids at any desired stage of the reaction and the precipitate so obtained can be washed, dried or treated in any other way depending upon the use to which the ester is to be put. The filtrate containing the remaining products of the reaction mixture, such as acids etc., can be treated and the valuable products recovered in any suitable way. In some cases it is possible to carry out the reaction advantageously in such a way that the cellulose ester formed does not go into solution during the reaction. This can be achieved by the addition of precipitating agents for the cellulose esters, such as benzol, etc., before or during the reaction, to the reaction mixture. The precipitating agent or agents which have no effect upon or are neutral toward the other ingredients of the reaction mixture should preferably be employed.

The suspension can also be obtained when the ingredients are mixed in such a way that the esters of cellulose as formed do not go into solution. Thus, in the case of cellulose nitrate, when it is desired to produce such a cellulose nitrate as is insoluble in the reaction mixture, the ratio of the amounts of phosphoric acid and nitric acid has to be chosen accordingly, so as to allow the reaction to take place in suspension. That is to say, it is possible to choose a precipitating agent, if it is desired to work in suspension, from among the ingredients which take part directly or indirectly in the reaction. The nitration or esterification can be interrupted at any stage of the reaction in order to obtain a product of any desired degree of esterification.

This invention also includes the esterification of articles or fabrics containing cellulose or its derivatives, in which case the esterification is carried out in suspension. For instance, a fabric containing cellulose can be passed through a reaction mixture, such as previously described, to produce esterification of all or part of the cellulose in the fabric without appreciably changing the appearance, etc. of this fabric. The properties and the qualities of the fabric however will be considerably altered. Cotton fabric so treated contained from 2% to 11% of nitrogen combined with cellulose. These fabrics are unique since among other advantages they will not rot when exposed to the action of sea water, whereas the original untreated fabric will rot upon similar exposure. Also paper and wood articles can be treated in the same fashion and the cellulose portion thereof esterified. This results in products with similar advantages.

The esters obtained by the applicant's process can be utilized as such or if desired can be "ripened" or "hydrated" in order to change their solubilities and improve their qualities. This ripening can be carried out on the ester when it is still in solution in the reaction mixture or after it has been precipitated and removed therefrom. Where the ester has been produced in suspension, the ripening process can be carried out either before or after the ester has been separated from the reaction mixture.

Any well known and suitable process of ripening can be employed in treating the esters obtained by the applicant's process. Care must be exercised in choosing the particular reagent and temperature to be utilized in ripening the various esters. The duration of the ripening process is also extremely important.

The cellulose esters produced by any of the methods heretofore or hereinafter indicated can be used, among other things, for the production of artificial silk, varnishes, enamels and solutions of all kinds and for the production of plastic masses, photographic and cinematographic films, for moulding articles, and in general for any application where nitrate of cellulose or other esters of cellulose are used or can be used. The term "articles" as used in the claims is to be interpreted as including within its scope the materials above mentioned, such as artificial silk, films, plastic masses, varnishes, solutions, etc. These esters can be used with or without the addition of gelatinizers, swelling or softening agents, camphor substitutes, high boiling point solvents, etc. etc.

In order to illustrate the present invention we cite the following examples:

1. A mixture of 60 ccs. of phosphoric acid ($H_3PO_4$) (Sp. Gr. 1.85) plus 20 ccs. of nitric acid ($HNO_3$) (concentrated, Sp. Gr. 1.4) plus 5 grams of metaphosphoric acid ($HPO_3$) were put on a water bath heated to 150° F. 3 grams of dried cotton linters were added to the mixture which was allowed to stand on the water bath sixty (60) minutes with good and frequent stirring. The nitro-cellulose so obtained in suspension was washed and was then soluble in acetone and in ether-alcohol (2-1). The product so obtained was found on analysis to contain approximately 9.65% of combined nitrogen (N).

2. A mixture of 60 ccs. of phosphoric acid ($H_3PO_4$) (Sp. Gr. 1.85) plus 20 ccs. of nitric acid ($HNO_3$) (concentrated, Sp. Gr. 1.4) plus 5 grams of metaphosphoric acid ($HPO_3$) were put on a water bath heated to 150° F. 3 grams of dried cotton linters were added to the mixture which was allowed to stand on the water bath thirty (30) minutes with good and frequent stirring. The nitro-cellulose so obtained in suspension was washed and was then soluble in acetone and in ether-alcohol (2-1). The product so obtained was found on analysis to contain approximately 9.8% of combined nitrogen (N).

3. A mixture of 60 ccs. of phosphoric acid ($H_3PO_4$) (Sp. Gr. 1.85) plus 20 ccs. of nitric acid ($HNO_3$) (concentrated, Sp. Gr. 1.4) and ¼ to 3% of sulphuric acid (concentrated) were put on a water bath heated to 150° F. 3 grams of dried cotton linters were added to the mixture which was allowed to stand on the water bath thirty (30) minutes with good and frequent stirring. The nitro-cellulose so obtained was separated and washed. The product so obtained is not completely soluble in the solvents mentioned in Examples 1 and 2 and contains approximately 9.8% of combined nitrogen (N).

4. 30 ccs. of phosphoric acid ($H_3PO_4$) (Sp. Gr. 1.85) plus 20 ccs. of fuming nitric acid ($HNO_3$) were mixed together and cooled. 3 grams of dried linters were added to this cooled solution and left at room temperature for 24 hours. Sample separated, washed and dried at low heat. The resulting product contained approximately 12.52% nitrogen (N). The product was soluble both in acetone and ether-alcohol (2-1). Different degrees of nitration can be produced in this way by varying the amount of fuming nitric acid used in the nitrating mixture, as well as the conditions of operation.

5. 3 grams of linters were treated with 35 ccs. of 95% phosphoric acid ($H_3PO_4$) plus 35 ccs. of concentrated nitric acid ($HNO_3$), plus 10 grams metaphosphoric acid ($HPO_3$). This mass was well stirred, left at room temperature for 24 hours, then the excess of the solution was squeezed out and the nitrated cotton put into another solution consisting of 25 ccs. phosphoric acid ($H_3PO_4$) and 25 ccs. of concentrated nitric acid ($HNO_3$), plus 10 grams of metaphosphoric acid ($HPO_3$) and left 24 hours at a temperature of 75° to 80° F. The separated, washed and dried product contained approximately 8.17% nitrogen (N) and is not soluble in the solvents used in Example 4.

These examples are only illustrative and not limitative. The quantities can be varied within a wide range as can also the temperatures and the duration of the reaction. Where desired the ortho-phosphoric acid can be entirely replaced by metaphosphoric acid in suitable quantities. The reaction can take place in the presence of additional ingredients, especially ingredients which have the property of extracting or absorbing water formed during the reaction or otherwise; for instance, other phosphorous derivatives having these qualities, or small quantities of sulphuric acid, etc. etc.

Instead of nitric acid or other mono basic acids, di-basic or poly-basic inorganic acids or their inorganic or organic substitution products can be used, as long as at least some of the replaceable hydrogen of the substituted acid is still free to cause the esterification with the cellulose. Thus, for instance, in using para-toluol-sulphonic acid ($C_6H_4CH_3SO_3H$) the corresponding para-toluol-sulfon ester of cellulose is obtained. Also mixed esters of cellulose can be obtained by using a mixture of acids or a mixture of acid derivatives.

By phosphoric acid as used in the claims we include the ortho and meta or any suitable phosphoric acids or mixtures of these acids. And in a similar manner we consider all inorganic acids and their suitable derivatives, with the exception of phosphoric acid, which is only used as a reaction medium, within the scope of our invention. Also the term "inorganic acid" in the claims is to be considered as including within its scope inorganic acids which have had some available hydrogen replaced by an organic radical; e. g. benzol sulphonic acid, ethyl sulphonic acid, etc.

The esters obtained according to the present invention, for instance the nitrocellulose so obtained, differ in some qualities from the esters of cellulose made according to the old methods and are therefore considered as new products. Also the various pre-treatment processes and different methods of ripening, as well as the products obtained therefrom, are to be considered as within the scope of the invention.

What we claim and desire to secure by Letters Patent is:

1. In process of manufacturing esters of cellulose which comprises treating material consisting essentially of cellulose in the presence of phosphoric acid with an acid other than phosphoric acid and capable of forming a cellulose ester and corresponding to the cellulose ester desired, which acid is selected from the group consisting of inorganic oxy acids and oxy acids derived therefrom.

2. A process of manufacturing esters of cellulose which comprises treating material consisting essentially of cellulose in the presence of phosphoric acid with an acid other than phosphoric acid and capable of forming a cellulose ester and corresponding to the cellulose ester desired, which acid is selected from the group consisting of inorganic oxy acids and oxy acids derived therefrom, heating the mixture, separating the cellulose ester and washing the same.

3. A process of manufacture of esters of cellulose which comprises mixing phosphoric acid and an acid other than phosphoric acid capable of forming a cellulose ester and corresponding to the cellulose ester desired, which acid is selected from the group consisting of inorganic oxy acids and oxy acids derived therefrom, adding material consisting essentially of cellulose thereto, stirring the mixture for about one hour while maintaining the temperature at approximately 100° to 130° F., separating the cellulose ester and washing the same.

4. A process of manufacture of esters of cellulose which comprises mixing phosphoric acid and an acid other than phosphoric acid capable of forming a cellulose ester and corresponding to the cellulose ester desired, which acid is selected from the group consisting of inorganic oxy acids and oxy acids derived therefrom, adding cotton linters thereto, stirring the mixture for about one hour while maintaining the temperature at approximately 100° to 130° F., separating the cellulose ester and washing the same.

5. A process of nitrating cellulose which comprises adding material consisting essentially of cellulose to a mixture of phosphoric acid and concentrated nitric acid, warming the mixture, separating the cellulose nitrate and then washing the same.

6. A process of nitrating cellulose which comprises adding 3 grams of dried cotton linters to a mixture of 60 ccs. of ortho-phosphoric acid (1.85 gravity) and 20 ccs. of concentrated nitric acid at 100°–130° F., stirring the mass for about one half hour while maintaining the temperature at 100°–130° F., separating the cellulose nitrate and then washing the same.

7. A process of manufacturing cellulose nitrate which comprises adding material consisting essentially of cellulose to a mixture of ortho-phosphoric acid, meta phosphoric acid and nitric acid at approximately 100°–130° F., stirring the reaction mixture while maintaining this temperature, separating the cellulose nitrate and washing the same.

8. A process of nitrating cellulose which comprises adding 3 grams of dried cotton linters to a mixture of 60 ccs. of concentrated ortho-phosphoric acid (1.85 gravity), 20 ccs. of concentrated nitric acid and 5 grams of meta phosphoric acid at approximately 100°–130° F., stirring the reaction mixture while maintaining the temperature at approximately 100°–130° F., separating the cellulose nitrate and washing the same.

9. A process of manufacturing cellulose nitrate which comprises adding material consisting essentially of cellulose to a cooled mixture of ortho phosphoric acid and fuming nitric acid, allowing the mass to stand for 24 hours at room temperature, then separating the cellulose nitrate and washing the same.

10. A process of making esters of cellulose which comprises treating material consisting essentially of cellulose in the presence of phosphoric acid and also in the presence of an amount of sulfuric acid corresponding to $\frac{1}{4}$ to 3% of the weight of the cellulose being treated, with an acid other than phosphoric acid and capable of forming a cellulose ester corresponding to the cellulose ester desired, which acid is selected from the group consisting of inorganic oxy acids and oxy acids derived therefrom.

11. A process of nitrating cellulose which comprises adding material consisting essentially of cellulose to a mixture of phosphoric acid and nitric acid containing an amount of sulphuric acid corresponding to $\frac{1}{4}$ to 3% of the weight of the cellulose, separating the cellulose nitrate and washing the same.

12. A process of nitrating cellulose which comprises adding 3 grams of dried cotton linters to a mixture of 60 ccs. of concentrated ortho-phosphoric acid, 20 ccs. of concentrated nitric acid and approximately $\frac{1}{4}$ to 3 ccs. of concentrated sulphuric acid, stirring the mass, separating the cellulose nitrate and washing the same.

13. A process of nitrating cellulose which comprises adding 3 grams of dried cotton linters to a mixture of 60 ccs. of concentrated ortho-phosphoric acid, 20 ccs. of concentrated nitric acid and approximately $\frac{1}{4}$ to $\frac{3}{4}$ of a cc. of concentrated sulphuric acid, stirring the mass, separating the cellulose nitrate and washing the same.

14. Inorganic esters of cellulose manufactured by treating a material consisting essentially of cellulose with an esterifying mixture in the presence of phosphoric acid and small amounts of sulphuric acid, said esters being free of sulphates.

15. Nitrocellulose products manufactured by treating cotton with mixtures of phosphoric and nitric acids, said products containing small amounts of phosphates.

16. A process of nitrating cellulose which comprises adding material consisting essentially of cellulose to a mixture of phosphoric acid and a vigorous nitrating agent, separating the cellulose nitrate and washing the same.

17. A process of manufacturing cellulose nitrate which comprises adding material consisting essentially of cellulose to a mixture of ortho-phosphoric acid and a vigorous nitrating agent, then separating the cellulose nitrate and washing the same.

18. A process of manufacturing cellulose nitrate which comprises adding material consisting essentially of cellulose to a mixture of concentrated ortho-phosphoric acid and a vigorous nitrating agent, then separating the cellulose nitrate and washing the same.

In testimony whereof, we have hereunto subscribed our names.

GEORGE W. MILES.
CAMILLE DREYFUS.